United States Patent Office 3,360,490
Patented Dec. 26, 1967

3,360,490
BITUMINOUS POLYESTER HALOGEN CONTAINING RESIN COMPOSITION
Walter A. Szymanski, Grand Island, and Robert E. Robinson and Robert C. Talbot, Niagara Falls, N.Y., assignors to Hooker Chemical Corporation, Niagara Falls, N.Y., a corporation of New York
No Drawing. Filed Nov. 16, 1961, Ser. No. 152,935
7 Claims. (Cl. 260—28.5)

This invention relates to bituminous compositions that are resistant to attack by organic chemicals. In another aspect, this invention relates to novel coating compositions comprising mixtures of bituminous materials and halogen-containing polyester resins.

Bituminous materials are used extensively in industrial applications. They are used in various roofing materials, for example, asphalt shingles and built up roofs. They also find extensive use in coated or impregnated papers, floor tile and for protective coatings, emulsions and paint, for example for coating outdoor structures. Bituminous materials have the advantage of relatively low cost, but cannot be used in many industrial applications that are subjected to contact with corrosive chemicals, and in particular organic chemicals such as benzene, chlorinated benzene, and the like. Bituminous coatings rapidly deteriorate in the presence of such substances. Moreover bituminous materials are not generally considered as having a high degree of fire retardance. In the presence of flames or heat, bituminous materials melt and the molten material runs and drips, thereby increasing the fire-hazard by spreading hot melt over the environment.

It is an object of this invention to provide a bituminous composition that is resistant to attack by chemicals, particularly organic chemicals. It is another object of the invention to provide bituminous coating compositions that can be used in industrial environments subjected to contact with organic chemicals. A further object of the invention is to provide an improved bituminous composition for use as a protective coating for lining for steel, wood, and concrete, as a roofing compound, as a calking compound, road surfacing and the like. Still another object of the invention is to provide novel compositions of mixtures comprising bituminous materials and halogen containing polyester resins.

These and other objects of the invention are satisfied by incorporating in bituminous materials a thermoset polyester comprising the reaction product of (1) a polymerizable linear polyester resin, comprised of the reaction product of a polycarboxylic acid and a polyhydric alcohol said resin having olefinic copolymerizable unsaturation and (2) a vinylidene monomer; a component of said thermoset polyester containing an adduct of hexahalocyclopentadiene wherein the halogen is selected from the group consisting of fluorine, chlorine, bromine and mixtures thereof, with a compound selected from the group consisting of a polycarboxylic compound containing aliphatic carbon-to-carbon unsaturation and a polyhydric alcohol containing aliphatic carbon-to-carbon unsaturation.

Many types of bituminous materials are commercially available, ranging from those derived from petroleum (asphaltic products), to those derived from coal tar. The asphaltic products include native asphalts, residual asphalts, blown petroleum asphalts precipitated by propane, fatty-acid pitches, and asphalts modified with oils such as linseed oil, cotton seed oil, castor oil, vegetable oils and animal oils, and various mixtures thereof. The tar products include the pitch obtained by distilling the highly volatile oils from coal tar as well as combinations thereof with oil gas tar and water-gas tar. These materials are provided in the form of semi-liquids to semi-solids where they are to be used for impregnating felted or woven fabrics in roofing and insulating compositions. The same groups of substances are commonly prepared with a harder consistency and also with a higher fusing-point. The latter materials are primarily used for coating or adhesive compositions. The foregoing list of bituminous materials is set forth to provide a better understanding of the type of material contemplated by the term "bituminous material." These and other bituminous materials are useful in the present invention.

The polyesters for use in this invention preferably contain either an adduct of hexahalocyclopentadiene and a polycarboxylic compound containing aliphatic carbon-to-carbon unsaturation or an adduct of hexahalocyclopentadiene and a polyhydric alcohol containing aliphatic carbon-to-carbon unsaturation. The preferred unsaturated polyesters are the reaction products of a polycarboxylic adduct of hexahalocyclopentadiene, another carboxylic compound containing carbon-to-carbon unsaturation and a polyhydric alcohol. Such a product is disclosed and claimed in U.S. Patent 2,779,701, issued Jan. 29, 1957. Other methods for incorporating either a polycarboxylic or polyhydric alcohol adduct of hexahalocyclopentadiene include: (1) the reaction of a polycarboxylic adduct of hexahalocyclopentadiene and an unsaturated polyhydric alcohol containing aliphatic carbon-to-carbon unsaturation, dirclosed and claimed in U.S. Patent 2,863,794, issued Dec. 9, 1958; (2) the reaction of a polyhydric alcohol adduct of hexahalocyclopentadiene with a polycarboxylic compound containing aliphatic carbon-to-carbon unsaturation dislosed and claimed in U.S. Patent 2,779,700, issued Jan. 29, 1957; and (3) the reaction of a polyhydric alcohol adduct of hexahalocyclopentadiene with another alcohol containing aliphatic carbon-to-carbon unsaturation and a polycarboxylic acid, disclosed and claimed in U.S. Patent 2,863,795, issued Dec. 9, 1958. An alternate method for incorporating an adduct of hexahalocyclopentadiene into a polyester resin involves reacting an unsaturated polyester resin with a copolymerizable compound containing an adduct of hexahalocyclopentadiene, such as disclosed and claimed in U.S. Patent 2,783,215, issued Feb. 26, 1957. The polyester resins containing the polycarboxylic and polyhydric alcohol adducts of hexahalocyclopentadiene can be modified by incorporating therein saturated carboxylic acids and anhydrides, as disclosed and claimed in U.S. Patent 2,890,144, issued June 9, 1959, and U.S. Patent 2,898,256, issued Aug. 4, 1959. When used in this specification, the term polycarboxylic compound refers to the polycarboxylic acids, acid anhydrides, acid halides and acid esters.

Among the adducts of hexahalocyclopentadiene and polycarboxylic compounds which may be used are:

1,4,5,6,7,7-hexachlorobicyclo-(2.2.1)-5-heptene-
  2,3-dicarboxylic acid;
1,4,5,6,7,7-hexachlorobicyclo-(2.2.1)-5-heptene-
  2,3-dicarboxylic anhydride;
1,4,5,6,7,7-hexachloro-2-methylbicyclo-2.2.1)-
  5-heptene-2,3-dicarboxylic anhydride;

the mono- or di-methyl ester of 1,4,5,6,7,7-hexachlorobicyclo-(2.2.1)-
  5-heptene-2,3-dicarboxylic acid;
1,4,5,6-tetrachloro-7,7-difluorobicyclo-(2.2.1)-
  5-heptene-2,3-dicarboxylic acid;
1,4,5,6,7,7-hexachlorobicyclo-(2.2.1)-5-heptene-
  2-acetic-2-carboxylic anhydride; and
1,4,5,6,7,7-hexachlorobicyclo-(2.2.1)-5-heptene-
  2,3-dicarbonyl chloride which is the adduct of hexachlorocyclopentadiene with fumaryl chloride.

Among the adducts of hexahalocyclopentadiene and polyhydric alcohols which may be used are:

1,4,5,6,7,7-hexachloro-2,3-bis-hydroxymethylbicyclo-(2.2.1)-5-heptene;
1,4,5,6,7,7-hexachloro-2,3-bis-hydroxymethylbicyclo-(2.2.1)-2,5-heptadiene;
3-(1,4,5,6,7,7-hexachlorobicyclo-(2.2.1)-5-heptene-2-yl)-methoxy-1,2-propanediol;
1,4,5,6-tetrachloro-7,7-difluoro-2,3-bis-hydroxymethylbicyclo-(2.2.1)-5-heptene;
1,4,5,6,7,7-hexabromo-2,3-bis-hydroxy-methylbicyclo-(2.2.1)-5-heptene;
3-(1,4,5,6-tetrachloro-7,7-difluorobicyclo-(2.2.1)-5-heptene-2-yl)-methoxy-1,2-propane diol.

These compounds and methods of preparation are disclosed in U.S. Patent No. 3,007,958, issued Nov. 7, 1961.

A variety of unsaturated acids, acid halides, acid anhydrides, and acid esters can be used in either the preparation of the polycarboxylic adducts of hexahalocyclopentadiene or to provide the unsaturation in the linear polyester molecules. The polycarboxylic acids and the corresponding acid halides, esters, anhydrides, and acid esters can include maleic, chloromaleic, ethylmaleic, itaconic, citraconic, zeronic, pyrocinchoninic and acetylene dicarboxylic, either alone or in mixtures.

Illustrative of the unsaturated polyhydric alcohols which can be used either in preparing the adducts of hexahalocyclopentadiene or in providing the unsaturation in the linear polyester molecules are compounds such as butene diol, pentene diol, the unsaturated hydroxy ethers such as allyl or vinyl glycerol ethers, allyl or vinyl pentaerythritol ethers and the like.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, hypophthalic, terephthalic, tetrachlorophthalic, adipic, succinic, and mixtures thereof.

Suitable saturated polyhydric alcohols for use in the preparation of the polyester resins include ethylene glycol, diethylene glycol, propylene glycol, dipropylene glycol, butane diol, pentane diol, hexane diol, glycerol, mannitol, sorbitol, and mixtures thereof.

The temperature for the reaction between polyhydric alcohols and polybasic acids ranges from about one hundred to two hundred degrees centigrade, although higher or lower temperatures can be used. Esterification catalysts such as para-toluene sulfonic acid, benzene sulfonic acid, beta-naphthalene sulfonic acid and the like, or amines such as pyridine, triethyl amine, quinoline and the like can be added to the reaction mixture. The proportion of polyhydric alcohol is approximately controlled by the total mol proportion of acids in the esterification reaction mixture. It is also preferred to react the polyhydric alcohols and polybasic acids in roughly equimolar proportion, however, either the acids or alcohols can be used in substantial excess, if it is desired to form a low molecular weight polyester resin.

A variety of ethylenically unsaturated monomers can be used for curing or cross-linking the ethylenically unsaturated polyesters. It is generally preferred that addition polymerization be practiced since no by-product ammonia or water is formed, and the problems resulting therefrom are not experienced. The monomers useful in curing the thermoplastic unsaturated polymers include vinylic compounds or mixtures thereof capable of cross-linking ethylenically unsaturated polymer chains at their points of unsaturation. Usually they contain the reactive groups $H_2C=C-$. Specific examples include styrene, chlorostyrenes, methyl styrenes such as alpha methyl styrene, p-methyl styrene, divinyl benzene, indene, unsaturated esters such as: methyl methacrylate, methyl acrylate, allyl acetate, diallyl phthalate, diallyl succinate, diallyl adipate, diallyl sebacate, diethylene glycol bis(allyl carbonate), triallyl phosphate and other allyl esters, and vinyl toluene, diallyl chlorendate, diallyl tetrachlorophthalate, the lower aliphatic esters other than methyl of methacrylic and acrylic acids, ethylene glycol diacrylate, dimethacrylate, diethacrylate, etc. The monomer may be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

As disclosed hereinbefore, the adduct of hexahalocyclopentadiene can be added in the cross-linking agent. Among such cross-linking agents which can be used for this purpose are the following:

diallyl-1,4,5,6,7,7-hexachlorobicyclo(2.2.1)-5-heptene-2,3-dicarboxylate;
diallyl-1,4,5,6,7,7-hexachloro-2-methylbicyclo-(2.2.1)-5-heptene-2,3-dicarboxylate;
diallyl-1,2,4,5,6,7,7-heptachlorobicyclo-(2.2.1)-5-heptene-2,3-dicarboxylate; and
triallyl-1,4,5,6,7,7-hexachlorobicyclo-(2.2.1)-5-heptene-2-acetate-2,3-dicarboxylate.

These compounds can be prepared by reacting hexachlorocyclopentadiene with the indicated dicarboxylic acid and esterifying the resultant product with an unsaturated alcohol such as allyl alcohol. Other cross-linking agents may advantageously be employed; for example reaction products of hexachlorocyclopentadiene with isoprene or butadiene retaining a reactive unsaturated linkage can be used as cross-linking agents directly without further reaction.

The proportion of olefinic cross-linking agent to unsaturated polyester can be varied within the ultimate limits each without departing from the scope of the invention, necessary to produce an infusible, insoluble, polyester resin. In general, the concentration of the unsaturated polyester in the olefinic cross-linking agent can vary between about ten and ninety percent. Polymerization catalysts are preferably added to the mixture of unsaturated polyester and olefinic cross-linking agent to effect setting or curing. Catalysts such as benzoyl peroxide, acetyl peroxide, lauryl peroxide, methylethyl ketone peroxide, cumene hydroperoxide and the like are satisfactory. Such catalysts are used in proportions of 0.01 to ten percent of the total resin depending on the efficiency of their action and whether or not substances which inhibit polymerization are present in the mixture. The polymerization reaction can also be hastened by adding promoters such as metals or metal salts, cobalt resinates, cobalt maleate, cobalt naphthenate and the like, or amines such as dibutylamine, or mercaptans such as dodecyl mercaptan. These are used in proportions similar or smaller to that stated for the catalysts.

The mixtures of bituminous materials and polyester resins of this invention are usually formulated with a liquid diluent to facilitate application of the coating compositions by the common methods such as brushing and spraying or rolling. When the diluent evaporates, a dry, durable protective coating of the mixture of bituminous material and polyester resin remains on the surface to be protected. The diluent used in the coating formulation of this invention should be a solvent or mixture of solvents that effects the mutual solubility of the bituminous material and the unsaturated polyester resin. More particularly, the specific diluents to the employed are dictated by the volatility and viscosity required by the method of applications of the coating, i.e., brushing, rolling or spraying. Diluents that satisfy these requirements are aliphatic and aromatic hydrocarbons, halogenated hydrocarbons, liquid products derived from wood, organic nitrogen compounds, organic acids and anhydrides, alcohols, esters and ketones and mixtures thereof. Generally the solvents that are most suitable have a boiling point of less than about 200 degrees centigrade. Typical examples of the preferred classes of diluents are as follows: The aliphatic hydrocarbons such as heptane, octane, decane, petroleum naphtha; the aromatic hydrocarbons such as benzene, toluene, xylene and ethylbenzene; the unsymmetrical chlorocarbons such as 1,1-dichloroethylene, trichloroethylene, isoamyl chloride, monochlorobenzene, and propylene dichloride; natural oils such as linseed oil, pine oil, and the like; organic nitrogen compounds such as pyridine and acetonitrile; organic acids and anhydrides such as acetic acid and acetic anhydride; alcohols such as butanol, isobutanol, amyl alcohol, hexyl alcohol; organic esters such as ethyl acetate, propyl acetate, ethyl propionate, butyl propionate and amyl acetate; ketones such as acetone, methylethyl ketone, diethyl ketone, methylpropyl ketone, methylbutyl ketone, ethylpropyl ketone and mesityl oxide.

It is also within the scope of the invention to incorporate in the bituminous compositions materials such as powdered or fibrous fillers, pigments, and the like that are commonly used in the art. Such substances can be either inorganic or organic in origin and are used for reducing the cost of the finished product, to impart weather resistant or to impart color to surface coatings. Commonly used additives include asbestos fibers, silica, limestone, slate, clay, and black or colored pigments. Various halogenated wax products can also be incorporated into the composition of the invention.

In preparing the bituminous compositions of this invention, the bituminous materials, the unsaturated polyester resin, the fillers and the solvents are blended in a variety of proportions depending on the desired end use for the compositions. It is generally preferred to blend the bituminous material and at least a portion of the solvent with agitation and heat to form a thick paste. Then the unsaturated polyester resin is added to the mixture with agitation and is followed by the desired fillers and the remainder of the diluent. The polymerization promoter can be added at this time or just prior to the use of the bituminous composition. The polymerization catalyst is added to the composition just prior to its use. In the bituminous compositions of this invention, it is preferred that the bituminous material comprise from about five to fifty weight percent of the total composition, and the polyester resin comprises from about forty to about eighty-five percent by weight of the total composition. The remainder of the composition comprises the diluents and fillers.

The following examples are intended to illustrate the invention but not to limit it.

*Example 1*

Into a suitable reaction vessel is charged ninety-one parts of ethylene glycol, 22.2 parts of diethylene glycol, 388.9 parts 1,4,5,6,7,7-hexachlorobicyclo-(2.2.1)-5-heptene-2,3-dicarboxylic acid and 78.8 parts of fumaric acid. The esterification reaction is carired out at a temperature of about one hundred and sixty degrees centigrade under an inert atmosphere of carbon dioxide until an acid number of about thirty-five is achieved. To five hundred parts of the unsaturated polymerizable polyester is added two hundred parts of styrene containing 0.07 part of hydroquinone inhibitor. The resulting polymerizable mixture of unsaturated polyester resin and monomer is suitable for use in the subsequent examples.

*Example 2*

Asphalt (10.6 parts) and 10.6 parts of a solvent with the trade name of Sovasol #5 (a mixture of aliphatic hydrocarbons boiling in the range of 157 to 194° C., manufactured by Socony Oil Company), are mixed in an agitated vessel. The mixture is heated to one hundred degrees centigrade, and 51.5 parts of the polymerizable mixture prepared in accordance with Example 1 is added to the mixture together with 2.5 parts of asbestos fiber. Methylethyl ketone (14.7 parts) is added to the mixture and agitation is continued until a uniform blend is obtained. To the resulting bituminous composition are added one percent of cobalt naphthenate and two percent of methylethyl ketone peroxide based on the weight of the polymerizable polyester. The bituminous composition is applied to concrete, steel, and wooden surfaces and found to form an adherent, durable coating upon the evaporation of the diluent. The diluent was evaporated from a sample of the bituminous composition and the dry composition was cut into cubes. The cubes of the bituminous compoistion were placed in containers of benzene and were found to discolor the benzene very slowly over a period of several days. By comparison the cubes of the asphalt that had not been formulated with the polyester resin were placed in containers of benzene and found to begin to discolor the benezene within a matter of minutes.

Additional cubes of the diluent-free bituminous composition of the invention were contacted with flame and found to burn very slowly, with no dripping or running of the bituminous composition. By comparison, samples of the asphalt that had not been formulated with the polyester resin were contacted with flames and found to burn readily. The hot melt dripped freely, resulting in the rapid spread of the burning asphalt material.

In the succeeding examples, various proportions of unsaturated polyester resins, asphalt, solvents and asbestos fillers are formulated using the procedure of Example 2. The formulations are shown in Table I. The compositions prepared in accordance with these examples also formed adherent coatings when applied to surfaces such as concrete, steel and wood. Likewise samples of the diluent-free compositions are found to be relatively insoluble in benzene as compared to the basic asphalt material and to be much more fire retardant than the basic asphaltic materials.

TABLE I

|  | Example No. | | | | | |
| --- | --- | --- | --- | --- | --- | --- |
|  | 3 | 4 | 5 | 6 | 7 | 8 |
| Polymerizable mixture of polyester and monomer | [1] 51.9 | 61.5 | 61.5 | 61.5 | 70.0 | 80.0 |
| Asphalt | 16.5 | 10.6 | 10.6 | 10.6 | 11.25 | 8.75 |
| Additives: | | | | | | |
|   Asbestos |  | 2.5 | 2.5 | 2.5 | 2.5 | 2.5 |
|   Polymethylmethacrylate solution | 15.1 |  |  |  |  |  |
| Liquid diluent: | | | | | | |
|   Toluene |  | 14.7 |  |  |  |  |
|   Xylene |  |  | 14.7 |  |  |  |
|   Mixed [2] |  |  |  | 14.7 |  |  |
|   Sovasol No. 5 | 16.5 | 10.6 | 10.6 | 10.6 | 16.25 | 8.75 |
| Catalysts (wt. percent of resin): | | | | | | |
|   Cobalt naphthenate | 1.5 | 1.0 | 1.0 | 1.0 | 1.5 | 1.5 |
|   Methylethyl ketone peroxide | 3.0 | 2.0 | 3.0 | 2.0 | 3.0 | 3.0 |

[1] All figures are parts by weight except for the catalysts.
[2] A mixture of 33% (by volume) of toluene, 42% xylene and 25% methylethyl ketone.

The bituminous compositions of this invention can be used in many applications such as in protective coatings or linings for metals, wood, and concrete. They can also be used for saturating felts that are subsequently used as an intermediate product in the manufacture of prepared roofings and composition shingles, for constructing "built-up" in the manufacture of bituminized floor coverings, for water-proofing membranes such as tarpaulins, and other applications in which bituminous saturated felts are commonly used. Other applications where these bituminous compositions can be used are in the manufacture of sidings for building construction, wrapping and packing paper, electrical and transmission insulation, cords and ropes, bituminized wall board, insulating board and the like, bituminous pipe, and asphalt mastic roofs. Other applications include cement and calking compounds.

While our invention has been described with reference to certain specific embodiments, it will be recognized by those skilled in the art, that many variations are possible without departing from the spirit or scope of the invention.

We claim:

1. A bituminous composition comprising (A) a bituminous material and (B) a thermoset polyester comprising the reaction product of (1) a polymerizable linear polyester resin, comprised of the reaction product of a polycarboxylic acid and a polyhydric alcohol, said resin having olefinic polymerizable unsaturation and (2) a vinylidene monomer in an amount sufficient to produce a thermoset polyester, a component of said thermoset polyester containing an adduct of hexahalocyclopentadiene wherein the halogen is selected from the group consisting of fluorine, chlorine, bromine and mixtures thereof, with a compound selected from the group consisting of a polycarboxylic compound containing aliphatic carbon-to-carbon unsaturation and a polyhydric alcohol containing aliphatic carbon-to-carbon unsaturation, said bituminous material comprising from about 5 to about 50 weight percent of the total composition, and said thermoset polyester comprising from about 40 to about 85 percent by weight of the total composition.

2. The composition of claim 1 wherein the adduct of hexahalocyclopentadiene is 1,4,5,6,7,7-hexachlorobicyclo-(2.2.1)-5-heptene-2,3-dicarboxylic acid.

3. The composition of claim 1 wherein the linear polyester resin comprises the reaction product of 1,4,5,6,7,7-hexachlorobicyclo - (2.2.1) - 5 - heptene-2,3-dicarboxylic acid, an unsaturated polycarboxylic compound, and a polyhydric alcohol.

4. The composition of claim 1 in admixture with a diluent that is a solvent for the bituminous material and the polymerizable linear polyester resin.

5. A bituminous composition comprising (A) a bituminous material, (B) a polymerizable mixture comprising (1) a polymerizable linear polyester resin, comprised of the reaction product of a polycarboxylic acid and a polyhydric alcohol, said resin having olefinic copolymerizable unsaturation, and (2) a vinylidene monomer in an amount sufficient to produce a thermoset polyester, and (C) a diluent which is a solvent for the bituminous material and the linear polyester resin; a component of said linear polyester resin containing an adduct of hexahalocyclopentadiene wherein the halogen is selected from the group consisting of fluorine, chlorine and bromine, with a compound selected from the group consisting of a polycarboxylic compound containing aliphatic carbon-to-carbon unsaturation, and a polyhydric alcohol containing aliphatic carbon-to-carbon unsaturation, said bituminous material comprising from about 5 to about 50 weight percent of the total composition, and said thermoset polyester comprising from about 40 to about 85 percent by weight of the total composition.

6. The composition of claim 5 wherein the adduct of hexahalocyclopentadiene is 1,4,5,6,7,7-hexachlorobicyclo-(2.2.1)-5-heptene-2,3-dicarboxylic acid.

7. The composition of claim 5 wherein the linear polyester resin comprises the reaction product of 1,4,5,6,7,7-hexachlorobicyclo - (2.2.1) - 5 - heptene-2,3-dicarboxylic acid, an unsaturated polycarboxylic compound, and a polyhydric alcohol.

References Cited

UNITED STATES PATENTS

| 2,667,425 | 1/1954 | Bierly. |
| 2,783,215 | 2/1957 | Robitshek et al. _____ 260—45.4 |
| 3,015,635 | 1/1962 | Bradley et al. _____ 260—18 |

OTHER REFERENCES

Abraham Asphalts and Allied Substances 5th ed., 1945, vol. I, D. Van Nostrand Co., New York, page 880.

MORRIS LIEBMAN, *Primary Examiner.*

ALPHONSO SULLIVAN, *Examiner.*

J. ZIEGLER, J. A. GAZEWOOD, *Assistant Examiners.*